(12) United States Patent
Lee

(10) Patent No.: US 6,567,175 B1
(45) Date of Patent: May 20, 2003

(54) DEVICE AND METHOD FOR CHANGING PRINTER DRIVERS IN A COMPUTER-PRINTER SYSTEM

(75) Inventor: Chang-Sub Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 948 days.

(21) Appl. No.: 08/824,344

(22) Filed: Mar. 26, 1997

(30) Foreign Application Priority Data

Mar. 26, 1996 (KR) .............................. 96/8253

(51) Int. Cl.[7] .............................. G06F 15/00; G06K 1/00
(52) U.S. Cl. .................... 358/1.14; 358/1.13; 358/1.15
(58) Field of Search ................. 395/112, 113, 395/114; 358/1.13, 1.14, 1.15

(56) References Cited

U.S. PATENT DOCUMENTS

| 5,228,118 A | | 7/1993 | Sasaki | |
|---|---|---|---|---|
| 5,467,434 A | * | 11/1995 | Hower, Jr. et al. | 395/114 |
| 5,559,933 A | * | 9/1996 | Boswell | 395/114 |
| 5,580,177 A | * | 12/1996 | Gase et al. | 400/61 |
| 5,594,840 A | * | 1/1997 | Sahay et al. | 395/113 |
| 5,602,974 A | * | 2/1997 | Shaw et al. | 395/114 |
| 5,625,757 A | * | 4/1997 | Kageyama et al. | 395/113 |
| 5,640,495 A | * | 6/1997 | Colbert et al. | 395/112 |
| 5,706,411 A | * | 1/1998 | McCormick et al. | 395/113 |
| 5,799,206 A | * | 8/1998 | Kitagawa et al. | 395/856 |

* cited by examiner

Primary Examiner—Mehrdad Dastouri
(74) Attorney, Agent, or Firm—Robert E. Bushnell, Esq.

(57) ABSTRACT

The present invention provides an integrated printer driver including a plurality of printer drivers which are produced in various types to satisfy various computer environments. The integrated printer driver automatically changes printer drivers when printing error occurs. The method for automatically changing the printer drivers comprises steps of determining the type of a printing error on occurrence, changing a preset printer driver to another appropriate printer driver of a plurality of printer drivers in a stored integrated printer driver in order to overcome the error corresponding to the determination, and setting the changed printer driver in order to enable the printer to recognize the printer driver.

17 Claims, 4 Drawing Sheets

DEVICE AND METHOD FOR CHANGING PRINTER DRIVERS IN A COMPUTER-PRINTER SYSTEM

CLAIM OF PRIORITY

This application makes reference to, incorporates the same herein, and claims all benefits accruing under 35 U.S.C §119 from an application entitled A Device And Method For Changing Printer Drivers In A Computer-Printer System earlier filed in the Korean Industrial Property Office on Mar. 26, 1996, and there duly assigned Ser. No. 96-8253 by that Office.

BACKGROUND OF THE INVENTION

1. Field of the Invention

This invention relates to a device and method for automatically changing printer drivers, more specifically, to a device and method which is capable of automatically searching for another appropriate printer driver stored therein when a printing error occurs with a preset printer driver wherein an integrated printer driver, which is a software, includes a plurality of printer drivers provided in various types to satisfy requirements depending on various computer environments.

2. Description of the Related Art

There is well known that communication between a computer and a printer is necessary to execute printing job and they are interconnected via an emulator making their communication possible. One of the emulators is a printer driver. Such printer drivers are provided in various types to satisfy many different computer environments depending on users and on production by printer manufacturers. Consequently, the printer drivers are compatible with various computer environments as well as various application programs and have unique properties for each.

In contemporary design practice a computer-printer system such as a Printing System Wherein One Of Printer Drivers Through Which Print Data Is Sent From A Data Processor To A Printer Is Selected Based On Interpreters Available On The Printer of I. Sasaki, U.S. Pat. No. 5,228,118, comprises a computer including a storage device, a display unit, a control unit and a transmit-receive interface device for printing; a local printer including a printing device and a transmit-receive interface device; and a communication line interconnecting the computer and the printer to communicate with each other.

In the storage device are stored printer drivers which operate according to hardware data of the local printer or a network printer, the type of operating system (e.g. DOS, Windows, UNIX, etc.) and application programs. The display unit exhibits a state of a printing process and an error message upon occurrence of an error. The transmit-receive interface device communicates with the local printer to transmit and receive data. The interface device has a time interrupt routine unit generating interrupt signals at fixed intervals to request a response from the local printer in order to sense a data transmitting state to the local printer and various error occurrences. When the time interrupt routine unit sends the response requesting signals to the local printer and does not receive any response therefrom, it sends signals indicating an occurrence of an error in the local printer to the control unit. Then, the control unit sends control signals directing the display unit to display a message indicative of the error occurrence in the printer.

The storage device, the display unit and the transmit-receive interface device are connected with the control unit via a data bus for controlling transmission of data and a control bus for controlling transmission of control signals. When the printer is connected to the computer a printer driver for controlling the printer is installed and stored in the storage device. This is the first connection between the computer and the printer. At this time, the control unit inputs fundamental information such as the type of printer, the types of the printer drivers, etc. into the storage device.

On receiving a print command, the computer-printer system calls the fundamental information, i.e. the type of the printer and the installed printer driver, which are stored in the storage device and attempts to control the printer. When the printer operational, the response requesting signals are sent at fixed intervals to the computer and the printer through the time interrupt routine unit of the transmit-receive interface device, thereby enabling a determination to be made regarding whether an error occurs in the computer or in the printer. If there is a determination that both the computer and the printer are operating normally the printing process proceeds and terminates upon completion. If, however, there is a determination that either the computer or the printer is not operating properly by not responding to the response requesting signals from the time interrupt routine unit, the control unit senses an occurrence of an error and determines the kind of error that has occurred. On occurrence of such errors, the control unit provides an indication of the error state to the operator by means of the printer or the display unit of the computer. Then, the operator determines the type of the error and if the error is due to a problem with the printer driver, determines whether there is another printer driver stored in memory which is capable of overcoming the error. The operation for selecting the appropriate printer driver is cumbersome and time-consuming. Furthermore it is not easy for the operator to find the cause of the error. This.results in low printing efficiency.

SUMMARY OF THE INVENTION

It is therefore an object of the present invention to provide an integrated printer driver which includes a plurality of printer drivers in a computer and a printer driver calling device for searching another appropriate printer driver among the plurality of printer drivers in the integrated printer driver when printing error occurs, and if there is a determination of the printer driver calling device that there is an appropriate printer driver capable of overcoming the error in the integrated printer driver, the printing job is continued with the newly selected printer driver without any manual operation for changing the printer drivers.

A method for achieving the above object determines the type of printing errors that occurred, selects from an integrated printer driver including a plurality of printer drivers and changes from a preset printer driver to a selected one of the plurality of printer drivers capable of overcoming the error, and sets the selected printer driver in order for the printer to be able to recognize the selected printer driver to continue a printing job.

An apparatus for achieving the above object in a computer-printer system 300 according to the invention utilizes a computer including a storage device having installed therein an integrated printer driver 25 into which are united a plurality of printer drivers and a plurality of types of errors that may occur in the computer or printer, a display unit for displaying the operational state of the computer or printer, a control unit and an integrated transmit-receive interface device for printing, a local (or network) printer, a communication line such as a bidirectional cable which enables the computer and printer to communicate with each other, and a time interrupt routine for requesting a response from the computer and the printer, such that no response provides an indication that an error has occurred. When an error occurs, the control unit determines the type of error and, if the error is due to an abnormal operation of a prime printer driver, selects another of the plurality of printer drivers to be set as the new prime printer driver.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same components, wherein.

DETAILED DESCRIPTION OF THE PREFERRED EMBODIMENTS

Figure 1:
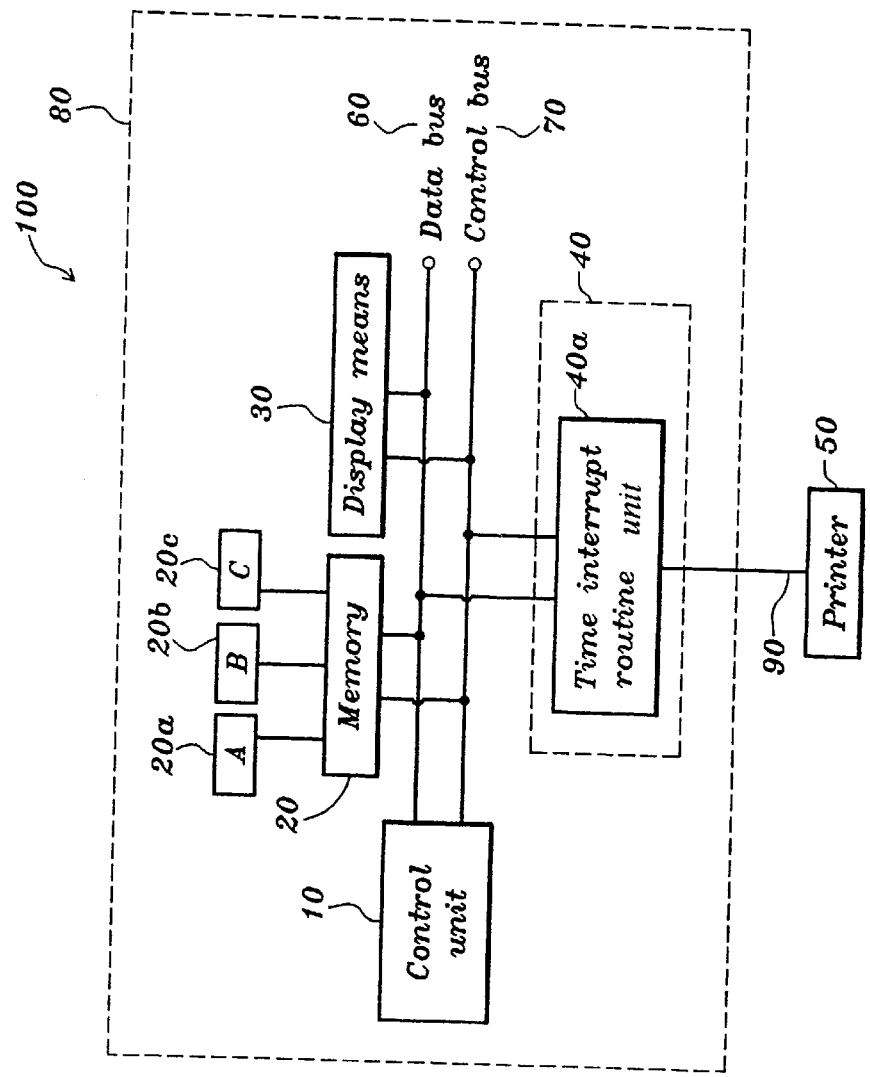
FIG. 1 is a block diagram of an exemplary computer-printer system.

Referring to FIG. 1, an exemplary computer-printer system 100 comprises: a computer 80 including a storage device 20, a display unit 30, a control unit 10 and a transmit-receive interface device 40 for printing; a local (or network) printer 50 including a printing device (not shown) and a transmit-receive interface device (not shown); and a communication line 90 interconnecting the computer and the printer to communicate with each other via the transmit-receive interface devices.

Printer drivers 20a, 20b, 20c are stored in storage device 20. Stored printer drivers 20a, 20b, 20c operate independently and in accordance with the hardware data of printer 50, the type of computer operating system (e.g. DOS, Windows, UNIX, etc.) and an application program. Printer drivers 20a, 20b, 20c may have been installed all together or selectively installed based on a user's selection. Display unit 30 displays the current state of a printing process or an error message upon occurrence of an error. Transmit-receive interface device 40 communicates with the local printer 50 to transmit and receive data. Interface device 40 has a time interrupt routine unit 40a for generating interrupt signals at fixed intervals to request a response from printer 50 in order to sense a data transmitting state to printer 50 and the occurrence of an error. When time interrupt routine unit 40a sends the response requesting signals to printer 50 and does not receive any response therefrom, the unit 40a sends signals indicating the occurrence of an error in printer 50 to control unit 10. Control unit 10 then sends control signals to display unit 30 to control the display of a message indicative of the error occurring in printer 50.

Storage device 20, display unit 30 and transmit-receive interface device 40 are connected to control unit 10 via a data bus 60 for controlling transmission of data and a control bus 70 for controlling transmission of control signals.

Figure 2:
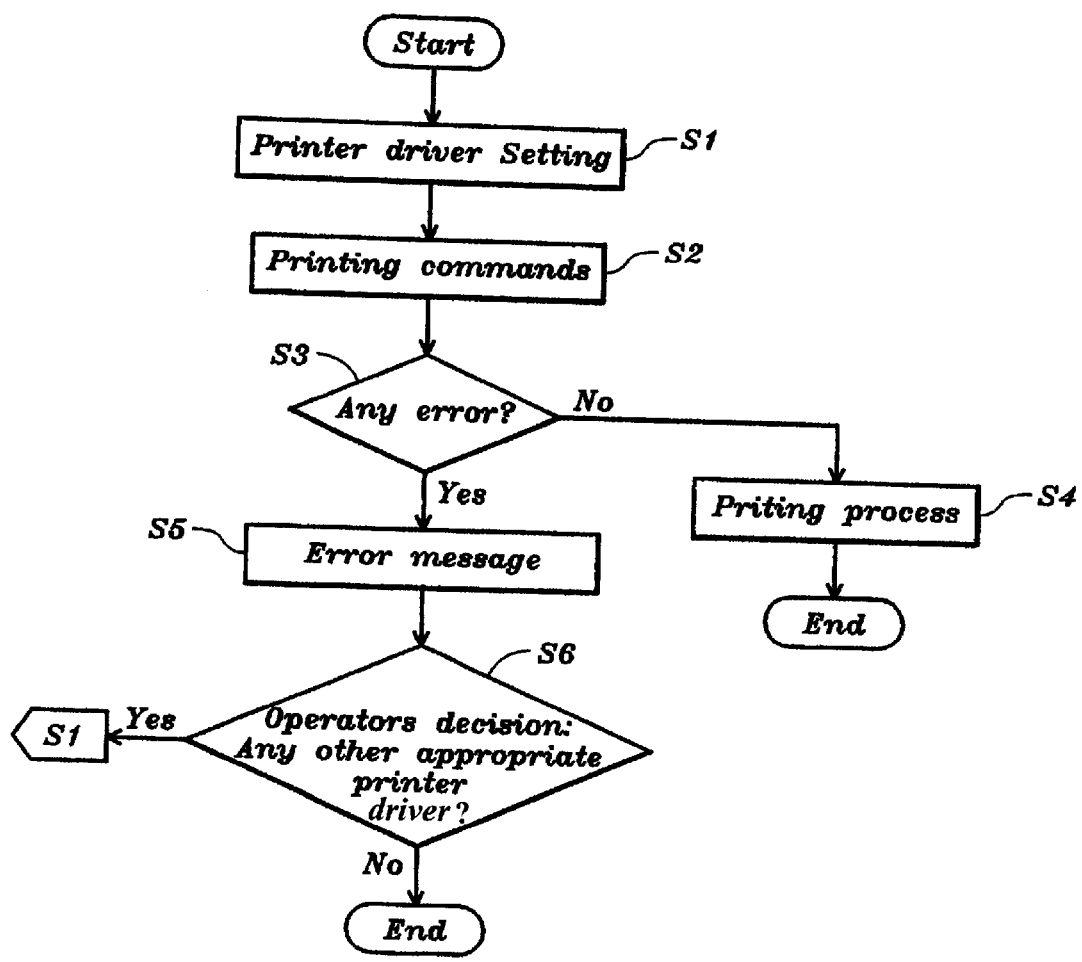
FIG. 2 is a flowchart of a printer driver changing process according to the exemplary computer-printer system.

Now referring to FIG. 1 and FIG. 2, the method for changing printer drivers when printing error occurs with a preset printer driver in the above described computer-printer system 100 will be described. First, printer 50 is connected with computer 80, followed by installation of printer 50, i.e. installation of one of the printer drivers 20a, 20b, 20c. This is the first connection between the computer and the printer. At this time, control unit 10 inputs fundamental information such as the printer type, the printer driver types, etc., into storage device 20. This is seen as the step S1 in FIG. 2.

Step S1 is followed by step S2 wherein print commands are received from an operator. On receiving the print commands, computer-printer system 100 reads the fundamental information, i.e. the type of printer 50 and the installed printer driver, e.g., printer driver 20a, which are stored in storage device 20, and activates printer 50.

When printer 50 is activated, response requesting signals are sent at fixed intervals to computer 80 and printer 50 through time interrupt routine unit 40a of transmit-receive interface device 40 of computer 80, in order to determine, in step S3, whether an error occurs in computer 80 or in printer 50. Upon a determination that both computer 80 and printer 50 are operating normally, the printing process proceeds, step S4, and terminates upon completion. Upon determination that either computer 80 or printer 50 is not operating normally, such as when one or the other does not respond to the response requesting signals, a storage device overflow error, a banding error or preset printer driver 20a does not support the application program to be printed. Control unit 10 senses an error occurrence and provides an indication of the error state to the operator by means of printer 50 or display unit 30 in step S5.

Then, the operator determines the type of error that occurred and decides how to fix it. If, for example, the error was due to preset driver 20a being unable to support the application program, the operator determines, in step S6, whether one of printer drivers 20b and 20c can be used to overcome the error. If there is a determination that the error can be overcome with another printer driver, the process returns to the step S1 to reset the printer driver. Then the process repeats steps S2 to S6. However, if there is a determination there is no printer driver capable of overcoming the error, the printing process stops.

Although the exemplary computer-printer system includes a plurality of printer drivers according to the computer's environment, the system begins a printing process only with the preset printer driver. Consequently, when the preset printer driver can not support a desirous application program or errors related to storage device occur, the operator has to stop the printing process to change the printer driver to another appropriate printer driver and then start the print process again. The operation for selecting the appropriate printer driver is cumbersome and time-consuming. Furthermore it is not easy for the operator to find the cause of the error. This results in low printing efficiency.

Figure 3:
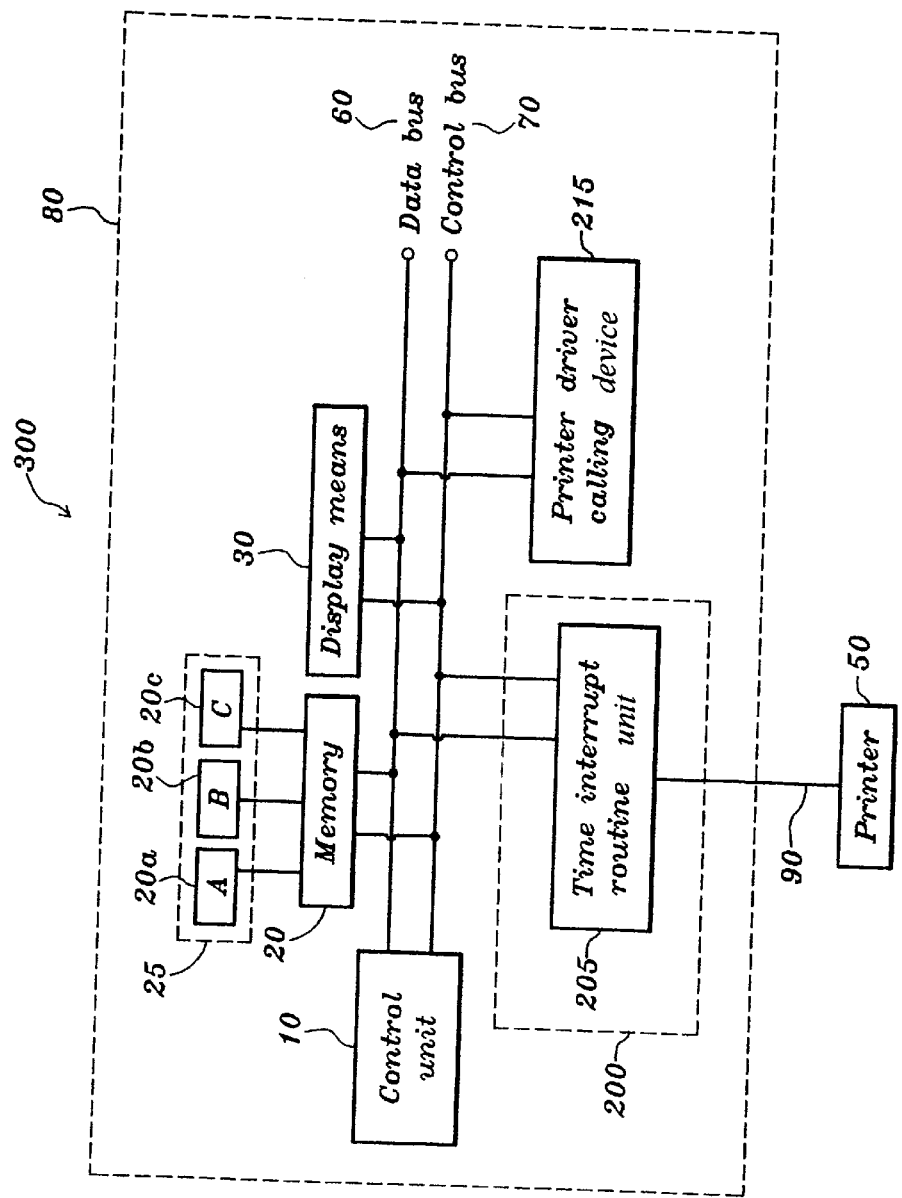
FIG. 3 is a block diagram of a computer-printer system according to the principles of the invention.

Now, the device and method for automatically changing an appropriate printer driver according to the present invention will be described with reference to FIGS. 3 and 4. Referring to FIG. 3, a computer-printer system 300 according to the invention utilizes a computer 80 including a storage device 20, a display unit 30, a control unit 10 and an integrated transmit-receive interface device 200 for printing, a local (or network) printer 50 including a printing device (not shown) and a transmit-receive interface (not shown); and a communication line 90 such as a bidirectional cable which enables computer 80 and printer 50 to communicate with each other.

Storage device 20 has stored therein hardware information corresponding to printer 50, printing data as well as types of errors possibly caused by an abnormal state of computer 80 and printer 50. Display device 30 displays a printing state or an error messages on occurrence of an error. Transmit-receive interface device 200 communicates with the printer 50 to transmit and receive data. Storage device 20 also has installed therein an integrated printer driver 25 into which are united a plurality of printer drivers 20a, 20b and 20c according to the type of operating system (e.g. DOS, Windows, UNIX) and the application programs being used by computer 80.

The integrated transmit-receive interface device 200 has a time interrupt routine unit 205 for generating interrupt signals to request response from computer 80 and printer 50, whereby it is possible to sense an operational state of computer 80, an operational state of printer 50, a data transmission state to printer 50 and the occurrence of an error in computer 80 and printer 50.

Control unit 10 includes a printer driver calling device 215 for searching and choosing one of the plurality of printer drivers 20a, 20b, and 20c in integrated printer driver 25 of storage device 20 corresponding to control signals from control unit 10 generated after control unit 10 determines the operational state of computer 80 and printer 50. When printing errors occur with prime printer driver 20a, for example, of storage device 20, control unit 10 receives information about the state of computer 80 and printer 50 (e.g. a storage device overflow error, a band error, a paper jam, and a no-response to application program error, etc.) from time interrupt routine unit 205. Then, control unit 10 inputs control signals into printer driver calling device 215 in order to call second printer driver 20b of storage device 20 in an attempt to overcome the error.

Figure 4:
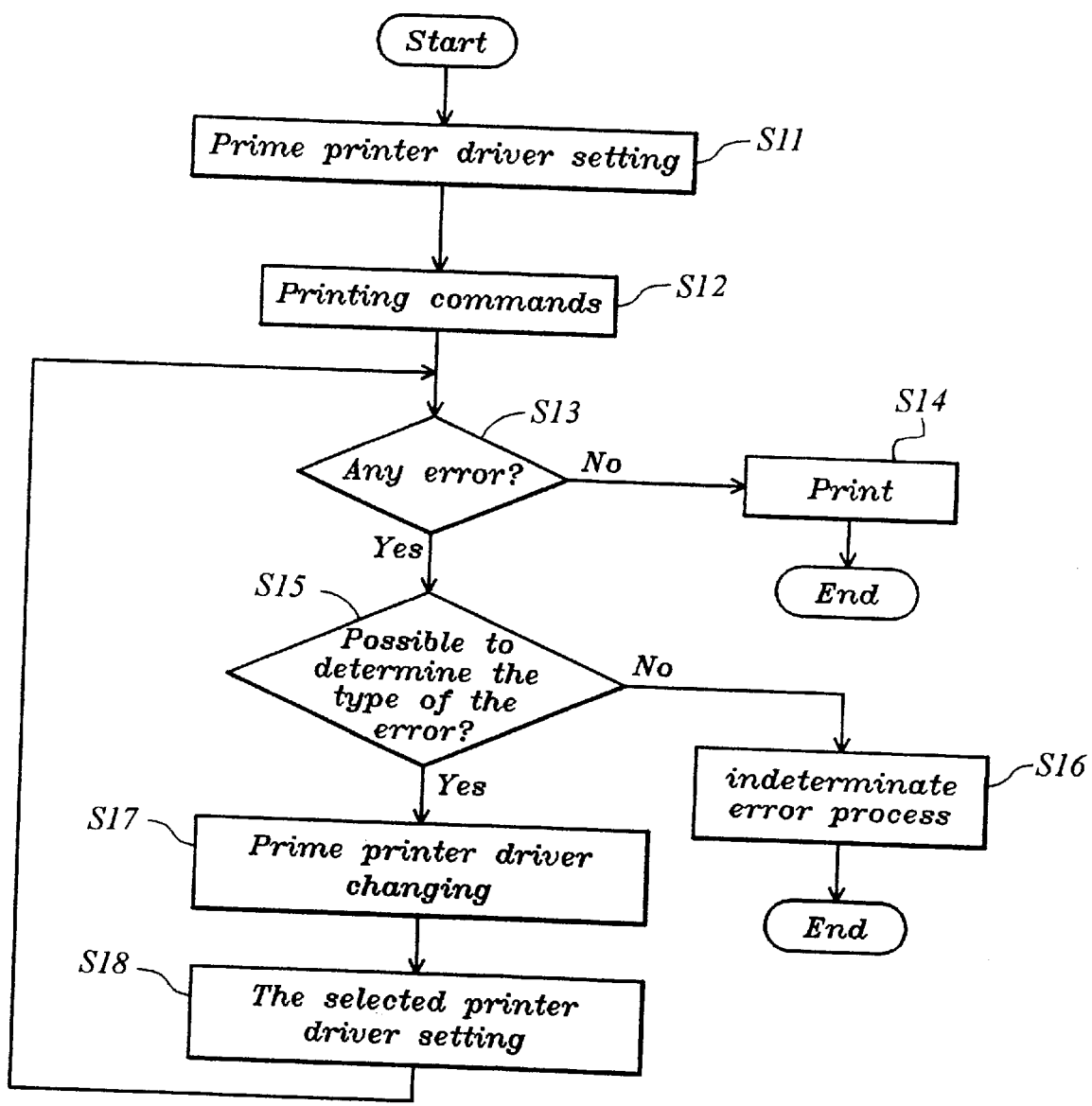
FIG. 4 is a flowchart of printer driver changing process for the computer-printer system of FIG. 3 according to the principles of the present invention.

Referring to FIG. 4, there is shown a flowchart of the printer driver changing process according to the invention. Printer 50 is first connected to computer 80 by communication cable 90, and this is followed by installation of the integrated printer driver 25 in storage device 20 of computer 50. Then the process is initiated in step S11 with the prime printer driver being set as one of the plurality of printer drivers 20a, 20b, 20c. The initial setting of the prime printer driver may be performed by the computer or the operator. Step S1 is followed by a step of receiving printing commands, step S12. The operator sends the printing commands to printer 50 through transmit-receive interface device 200 in order to output print data generated in an application program. Then, time interrupt routine unit 205 sends signals for requesting response from computer 80 and printer 50 at fixed intervals to periodically check for the occurrence of an error, step S13. If the time interrupt routine unit 205 does not sense an error occurrence, in other words the time interrupt routine unit receives a normal operating response from computer 80 and printer 50, the printing process proceeds in step 14 and terminates upon completion.

In step S15, when computer 50 or printer 80 fails to respond to the response request signals from time interrupt routine unit 205, control unit 10 is informed of an error occurring in computer 80 or printer 50 in response to step S 13. Then, control unit 10 determines the operational state of computer 80 or printer 50 corresponding to the error information supplied by time interrupt routine unit 205, by comparing the error information with the types of errors stored in storage device 20. When it is determined that the cause of the no-response from computer 80 or printer 50 are not found, the errors are deemed impossible to be solved and the printing process is stopped, step S16.

When control unit 10 determines the cause of the no-response from computer 8000 printer 50 to be due, for example, to an abnormal state of the prime printer driver by comparing the detected error with the types of error stored in the storage device 20, control unit 10 selects, in step S17, another printer driver from the plurality of printer drivers 20a, 20b, 20c capable of overcoming the error, and inputs proper control signals for selecting the selected printer driver into printer driver calling device 215. Printer driver calling device 215 then calls, or selects, the printer driver corresponding to the input control signals and sets up the newly selected printer driver as a new prime printer driver in step S18. Upon completion of the new prime printer driver setting, the new prime printer driver releases the error state and the process returns to step S13, and if no error is detected by step S13 the process proceeds with the completion of the printing process in step S14.

As described above, this invention solves the errors related to an abnormal state of operation of a printer driver by changing the printer driver to another appropriate printer driver out of a plurality of printer drivers installed as an integrated printer driver. This results in enhanced printing continuity and high printing efficiency.

What is claimed is:

1. A method for changing printer drivers in a computer-printer system, comprising the steps of:

sending a print command to a printer to begin a print operation;

periodically transmitting a response request signal to said printer;

determining that an error has occurred when said printer fails to respond to said response request signal;

checking whether said error corresponds to any one of a plurality of specific error types stored in a memory of a computer of said computer-printer system;

stopping said print operation when said step of checking determines that said error does not correspond to any of said specific error types stored in said memory;

changing from a printer driver initially set to control said printer to a second printer driver stored in said memory when said error corresponds to one of said specific error types corresponding to an abnormal operational state of said initially set printer driver; and setting up said second printer driver to control said printer and returning to said step of periodically transmitting said response request signal to said printer.

2. The method as set forth in claim 1, further comprising a step of finishing said print operation when said printer responds to said response request signal.

3. The method as set forth in claim 1, wherein said step of periodically transmitting a response request signal to said printer comprises transmitting said response request signal to said printer at fixed intervals.

4. The method as set forth in claim 1, wherein said step of periodically transmitting a response request signal to said printer comprises transmitting said response request signal to said computer.

5. The method as set forth in claim 1, wherein said step of periodically transmitting a response request signal to said printer comprises transmitting said response request signal to said computer and said printer at fixed intervals.

6. An apparatus for changing printer drivers in a computer-printer system wherein a computer and a printer are connected via a communication line, said apparatus comprising:

control means for controlling said printer to start a print operation;

interface means for periodically transmitting a response request signal to said printer during said print operation;

storage means for storing a plurality of printer drivers and for storing a plurality of specific error types;

said interface means for providing an error signal to said control means when said printer fails to respond to said response request signal;

said control means for comparing said error signal to said specific error type stored in said storage means;

said control means for stopping said print operation when said error signal does not correspond to any of said specific error types stored in said storage means;

said control means for changing from a printer driver initially set to control said printer to a second one of said plurality of printer drivers stored in said storage means when said error signal corresponds to one of said specific error types when said one of said specific error types corresponds to an abnormal operational state of said initially set printer driver; and said control means for setting up said second of said printer drivers to control said printer.

7. The apparatus as set forth in claim 6, wherein said interface means comprises a time interrupt routine for periodically transmitting said response request signal at fixed intervals.

8. The apparatus as set forth in claim 6, wherein said control means comprises:

a control unit for generating control signals in response to an operational state of said computer and said printer, the operational state of said printer being provided to said control unit by an information signal output by said interface means; and a calling unit for selecting one of said plurality of printer drivers stored in said storage means corresponding to one of said control signals generated by said control unit when said information signal output by said interface means is said error signal corresponding to one of said specific error types.

9. The apparatus as set forth in claim 6, wherein said interface means transmits a second response request signal to said computer.

10. The apparatus as set forth in claim 9, wherein said interface means comprises a time interrupt routine for periodically transmitting said response request signals at fixed intervals.

11. The apparatus as set forth in claim 6, further comprising display means for displaying an operational state of said printer.

12. The apparatus as set forth in claim 6, further comprising display means for displaying an operational state of said computer and said printer.

13. A method for changing printer drivers in a computer-printer system wherein a computer and a printer are connected via a communication line, said method comprising the steps of:

periodically transmitting response request signals to said computer and said printer during a print operation;

determining that an operational error has occurred when one of said computer and said printer fail to respond to said response request signals;

checking whether said operational error corresponds to any one of a plurality of specific error types stored in a memory of said computer;

stopping said print operation when said step of checking determines that said operational error does not correspond to any of said specific error types stored in said memory;

changing from an initially set printer driver for controlling said printer to a second printer driver stored in said memory when said operational error corresponds to one of said specific error types corresponding to an abnormal operational state of said initially set printer driver; and setting up said second printer driver to control said printer and returning to said step of periodically transmitting said response request signals.

14. The method as set forth in claim 13, further comprising a step of finishing said print operation when both said computer and said printer respond to said response request signals.

15. The method as set forth in claim 13, wherein said step of periodically transmitting said response request signals comprises transmitting said response request signals to said computer and said printer at fixed intervals.

16. The method as set forth in claim 13, further comprising a step of sending a print command to said printer to begin said print operation.

17. The method as set forth in claim 13, further comprising the steps of:

storing an integrated printer driver in said memory, said integrated printer driver including at least a first printer driver and said second printer driver; and setting up said first printer driver as said initially set printer driver.

* * * * *